United States Patent [19]

Wacker et al.

[11] Patent Number: 4,683,808
[45] Date of Patent: Aug. 4, 1987

[54] LIGHT ALLOY PISTON FOR INTERNAL COMBUSTION ENGINES

[75] Inventors: Erich Wacker, Heilbronn; Ulrich Landau, Oedheim; Wilfried Sander, Neckarsulm; Klaus Schellmann, Weinsberg, all of Fed. Rep. of Germany

[73] Assignee: Kolbenschmidt Aktiengesellschaft, Neckarsulm, Fed. Rep. of Germany

[21] Appl. No.: 745,780

[22] Filed: Jun. 17, 1985

[30] Foreign Application Priority Data

Jul. 14, 1984 [DE] Fed. Rep. of Germany ....... 3425965

[51] Int. Cl.$^4$ ................................................ F16J 1/04
[52] U.S. Cl. ...................................... 92/208; 92/238; 92/239
[58] Field of Search .................................. 92/187–191, 92/238, 239, 208; 123/193 P

[56] References Cited

U.S. PATENT DOCUMENTS

| | | | |
|---|---|---|---|
| 1,578,877 | 3/1926 | Caminez | 92/187 |
| 2,177,574 | 10/1939 | Malina | 92/239 X |
| 3,841,386 | 10/1974 | Niimi et al. | 123/193 P |
| 4,274,372 | 6/1981 | Kelm et al. | 92/187 X |

FOREIGN PATENT DOCUMENTS

| | | | |
|---|---|---|---|
| 571548 | 3/1933 | Fed. Rep. of Germany | 92/190 |
| 608102 | 7/1926 | France | 92/238 |

Primary Examiner—Edward K. Look
Attorney, Agent, or Firm—Sprung Horn Kramer & Woods

[57] ABSTRACT

A light alloy piston for internal combustion engines has a skirt which is closed at its lower end and at locations disposed adjacent to the bosses on both sides of the horizontal plane through the piston pin is set back so as to form respective recesses. In order to avoid a retention of oil in the recesses those end portions of the skirt which adjoin the recesses are inwardly offset from the outside peripheral surface of the piston.

4 Claims, 4 Drawing Figures

LIGHT ALLOY PISTON FOR INTERNAL COMBUSTION ENGINES

BACKGROUND OF THE INVENTION

The present invention relates to a light alloy piston for internal combustion engines, which piston comprises a piston skirt that is closed at its lower end and, at locations disposed adjacent to the bosses on both sides of the horizontal plane extending through the piston pin, is inwardly offset from the outside peripheral surface of the piston to such an extent that the distance between the outer ends of the bosses amounts to 60 to 80% and the overall width of the load-carrying portion of the skirt amounts to 70 to 55% of the piston diameter.

In view of the high requirements to be met by modern high-speed internal combustion engines as regards their running properties, it is desired in the art, inter alia, to reduce the weight of components of internal combustion engines because this will reduce the fuel consumption so that energy can be saved. The reduction in weight also has a favorable influence on the behavior of the engine as regards noise and vibration so that desired high riding comfort can be obtained. Part of these objects of development can be achieved by the use of lightweight light alloy pistons because they constitute smaller oscillating masses. On the other hand, a reduction in weight must not adversely affect the safety of operation and the life of the internal combustion engine.

It is known that modern methods of investigation, such as the finite elements method, permit a determination of the strength limits of conventional solid-skirt light alloy pistons having minimum piston skirt and piston head thicknesses. The result of these investigations is the light alloy piston having a reduced weight. The reduction of all wall thicknesses and of the interior profiles have permitted a reduction in weight by about 10%. Further developments have resulted in the provision of a light alloy piston in which the weight has been reduced where the piston skirt is provided, adjacent to the bosses on both sides of the horizontal plane extending through the piston pin, with respective recesses formed by inwardly offset, straight or arcuate portions of the piston skirt. The bosses are offset toward the center as far as possible so that the distance between the outer ends of the bosses is not in excess of 65% of the diameter of the piston and a very short piston pin can be inserted, which has an overall length of 60% of the piston diameter. The distance between the inner ends of the bosses amounts only to 25% and the width of the bosses amounts only to 22% of the piston diameter. The shortening of the piston pin and the reduction of the width of the bosses has resulted in a distinct reduction in weight by up to 20% of the weight of the conventional solid-skirt piston. The circular shape of the skirt is retained at its end so that the guidance of the piston along a straight line is ensured. In spite of its light weight, that piston has the same satisfactory performance and strength characteristics as a conventional solid-skirt piston under all operating conditions. A similar behavior is exhibited by the light alloy piston which is described in laid-open German application No. 2841980 and comprises a piston skirt which, adjacent to the piston pin bosses, is inwardly offset from the outside peripheral surface of the piston and which skirt is non-symmetrical with respect to the vertical plane through the piston pin. In that piston, the piston skirt is connected to the piston pin bosses by carrying ribs, which extend at an angle of 30 to 60 degrees to the piston pin axis on one side and at an angle of 90 degrees to said axis on the other side.

It has been found, however, that an excessive quantity of oil is collected in the recesses of the light alloy piston described first hereinbefore under certain operating conditions, in dependence on the overall oil balance of the internal combustion engine, and that that quantity of oil cannot flow off as fast as is required. During the operation of the engine that quantity of oil will adversely affect the return flow of the oil that has been scraped from the cylinder through the oil scraper ring disposed in the lower ring-carrying zone so that oil may be retained and may be forced past the ring-carrying zone into the combustion chamber, wherein that oil is burnt so that the oil consumption of the internal combustion engine is increased.

SUMMARY OF THE INVENTION

It is an object of the present invention to design the light alloy piston described first hereinbefore so that a retention of oil in the recesses will be avoided but the other good performance and strength characteristics of the piston will be ensured under all operating conditions.

That object is accomplished in that those end portions of the piston skirt which are disposed below and adjoin the recesses are inwardly offset from the outside peripheral surfaces of the piston.

In a preferred embodiment of the invention the overall width of the piston skirt in the end portions thereof which are disposed below the recesses and adjoin the latter amounts to 70 to 95%, preferably 75 to 85%, of the piston diameter.

In a special embodiment of the invention, the end portions of the piston skirt are offset toward the center of the piston to 80 to 95% of the piston diameter on the pressure side and to 70 to 90% of the piston diameter on the backpressure side.

In a particularly advantageous embodiment the piston is composed of the light alloy of the type AlSi12-CuMgNi.

As a result of the measure adopted in accordance with the invention, a retention of oil in the recesses is prevented. Owing to the clearances at the lower end of the piston complies with high requirements regarding oil consumption, gas, blow-by, noise and low wear even after a long running time. Besides, the piston is lighter in weight by 2 to 6% then the light weight piston discribed first hereinbefore. The piston in accordance with the invention may be designed as a single-metal piston or as a cast piston in which steel struts are embedded for expansion control. Single-metal pistons are suitable for motors having light allow cyclinders and for a combination of light alloy housings and inserted thin-walled liners of gray cast iron. In all naturally aspirated engines having housings of grey cast iron, a piston having an expansion control strut is used.

The invention is illustrated by way of example on the drawings and will be explained more in detail hereinafter. In the drawings:

DETAILED DESCRIPTION OF THE INVENTION

Figure 2:
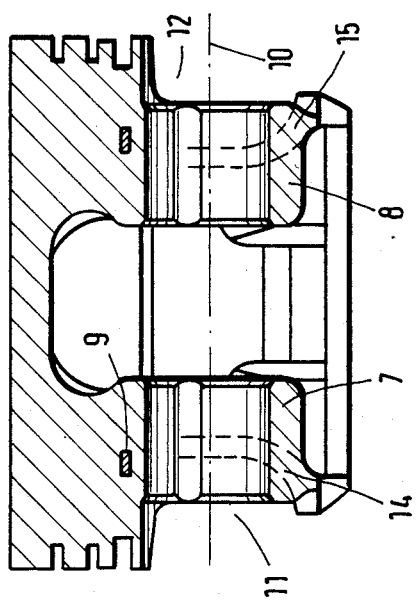
FIG. 2 is a longitudinal sectional view taken on section I—I in FIG. 1.
Figure 1:
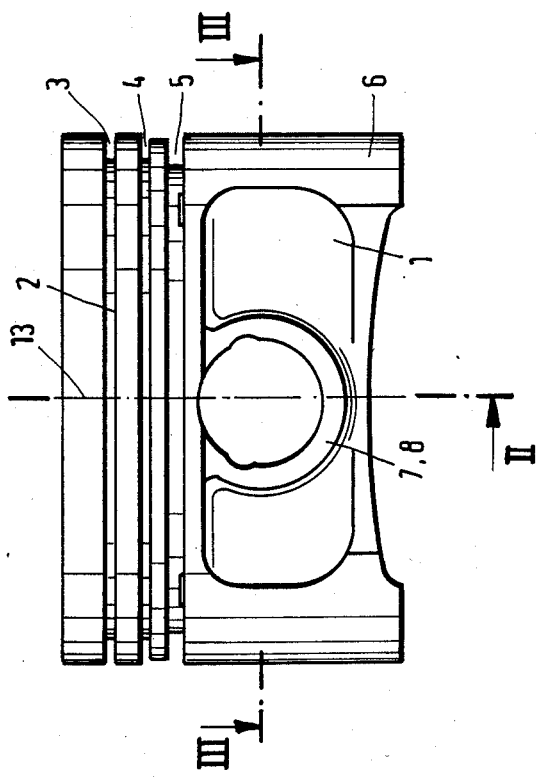
FIG. 1 is a side elevation showing a light alloy piston.
Figure 3:
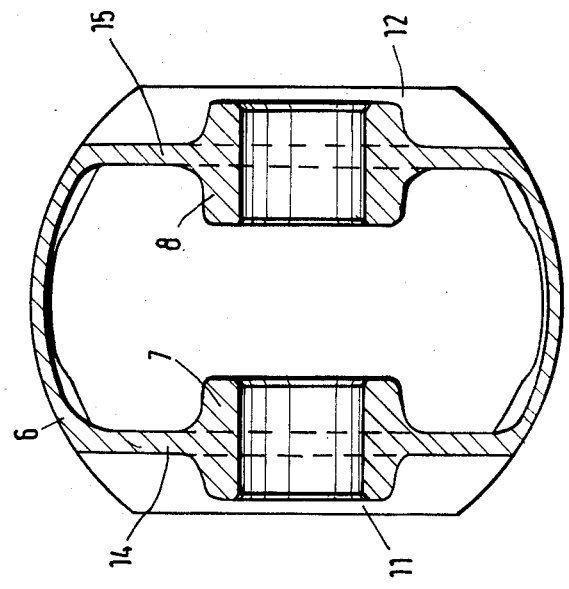
FIG. 3 is a transverse sectional view taken on section line II—II in FIG. 1.

Referring to FIGS. 1-3, the light alloy piston 1 is 86 mm in diameter and has an overall height of 56 mm and at its head 2 is provided with three ring grooves 3, 4, 5. An annular strut 9 of steel for expansion control is embedded in the piston casting between the piston head 2 and the piston skirt 6. To save weight, the skirt 6 is inwardly offset along a straight line adjacent to the bosses 7, 8 on both sides of the horizontal plane 10 through the piston pin so that recesses 11, 12 are formed and the distance between the outer ends of the bosses 7, 8 is about 72% of the piston diameter. The distance between the inner ends of the bosses 7, 8 is about 25% and the width of of each hub is about 22% of the piston diameter. The skirt 6 is supported by walls 14, 15, which extend at right angles to the vertical plane 13 through the piston pin. The walls 14, 15 extend at right angles to the axis of the piston pin from the recesses 11, 12 toward the lower end of the skirt 6 and are outwardly convexly curved so that the width of the skirt is locally increased and the overall width of the skirt in the vertical plane 13 through the piston pin is larger by 15 to 35% than the smallest width of the skirt 6 on both sides of the horizontal plane through the piston pin.

Figure 4:
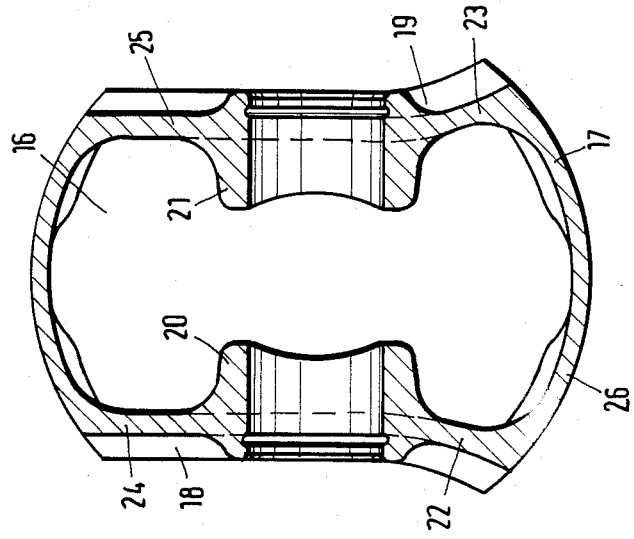
FIG. 4 is a transverse sectional view taken on the horizontal plane through the piston pin of a light alloy piston having a non-symmetrical skirt.

The piston 16 shown in FIG. 4 has a non-symmetrical skirt 17, which is formed with recesses 18, 19 adjacent pin bosses 20, 21 are substantially offset toward the center of the piston. On the pressure side of the piston 16, the skirt is supported by walls 22, 23, which extend at right angles to the axis of the piston pin and outwardly at an angle of 5 to 30 degrees so that the width of the skirt is increased in the vertical plane 13 through the piston pin. On the backpressure side, the piston comprises skirt walls 24, 25 which extend through the bosses 20, 21 at right angles to the axis of the piston pin. The skirt walls 22, 23, 24, 25 extend from the recesses 18, 19 to the lower end of the skirt 6 and are outwardly convexly curved in the vertical plane through the piston pin so that the width of the skirt 26 below the axis of the piston pin is larger by 15 to 35% than the smallest width of the skirt on both sides of the horizontal plane through the piston pin.

What is claimed is:

1. In a light alloy piston for an internal combustion engine, wherein the piston includes bosses, a piston pin, a piston shirt having a closed lower end and which is inwardly offset from the outside peripheral surface of the piston, at locations disposed adjacent to the bosses on both sides of a horizontal plane extending through the piston pin, to such an extent that the distance between outer ends of the bosses amounts to 60 to 80% of the piston diameter and the overall width of the load carrying portion of the skirt amounts to 70 to 95% of the piston diameter, the improvement wherein the inwardly offset portions of the piston skirt form recesses, the piston skirt has end portions which extend below and adjoin the recesses and which are inwardly offset from the outside peripheral surface of the piston, the skirt has walls which extend at right angles to a vertical plane through the piston pin and which extend at right angles to the axis of the piston end portion of the piston skirt and are outwardly convexly locally increased and the overall width of the skirt in the vertical plane through the piston pin is larger by 15 to 35% than the smallest width of the skirt on both sides of the horizontal plane through the piston pin.

2. The light alloy piston according to claim 1, wherein the overall distance between said end portions of the piston skirt which are inwardly offset from the outside peripheral surfaces of the piston amounts to 70 to 75% of the piston diameter.

3. The light alloy piston according to claim 1, wherein said end portions of the piston skirt are offset toward the center of the piston to 80 to 95% of the piston diameter on the pressure side and to 70 to 90% of the piston diameter on the backpressure side.

4. The light alloy pistón according to claim 2, wherein the overall distance between said end portions amounts to 75 to 85% of the piston diameter.

* * * * *